United States Patent
Coffey

(10) Patent No.: US 7,099,412 B2
(45) Date of Patent: Aug. 29, 2006

(54) SEQUENTIAL DECODING WITH BACKTRACKING AND ADAPTIVE EQUALIZATION TO COMBAT NARROWBAND INTERFERENCE

(75) Inventor: John T. Coffey, San Francisco, CA (US)

(73) Assignee: Texas Instruments Incorporated, Dallas, TX (US)

( * ) Notice: Subject to any disclaimer, the term of this patent is extended or adjusted under 35 U.S.C. 154(b) by 781 days.

(21) Appl. No.: 10/026,042

(22) Filed: Dec. 21, 2001

(65) Prior Publication Data

US 2002/0168040 A1 Nov. 14, 2002

Related U.S. Application Data

(60) Provisional application No. 60/290,690, filed on May 14, 2001.

(51) Int. Cl.
*H03D 1/00* (2006.01)
(52) U.S. Cl. .................................. 375/341
(58) Field of Classification Search ............ 375/316, 375/326, 327, 341, 350, 348, 340, 260, 265
See application file for complete search history.

(56) References Cited

U.S. PATENT DOCUMENTS

| 5,285,480 | A | | 2/1994 | Chennakeshu et al. | |
|---|---|---|---|---|---|
| 5,327,298 | A | * | 7/1994 | Ottesen et al. | 360/48 |
| 5,363,408 | A | * | 11/1994 | Paik et al. | 375/261 |
| 5,440,572 | A | * | 8/1995 | Kitaori | 714/794 |
| 5,574,751 | A | * | 11/1996 | Trelewicz | 375/265 |
| 5,636,246 | A | * | 6/1997 | Tzannes et al. | 375/260 |
| 5,717,717 | A | | 2/1998 | Yang et al. | |
| 6,088,368 | A | * | 7/2000 | Rubinstain et al. | 370/480 |
| 6,256,358 | B1 | * | 7/2001 | Whikehart et al. | 375/316 |
| 6,665,355 | B1 | * | 12/2003 | Chen et al. | 375/321 |
| RE38,456 | E | * | 3/2004 | Patel et al. | 348/726 |
| 6,707,624 | B1 | * | 3/2004 | Erden et al. | 360/31 |
| 6,804,695 | B1 | * | 10/2004 | Hsu | 708/322 |
| 2001/0035994 | A1 | * | 11/2001 | Agazzi et al. | 359/152 |
| 2001/0035997 | A1 | * | 11/2001 | Agazzi | 359/173 |
| 2004/0156431 | A1 | * | 8/2004 | Agazzi et al. | 375/229 |

* cited by examiner

*Primary Examiner*—Emmanuel Bayard
(74) *Attorney, Agent, or Firm*—Steven A. Shaw; W. James Brady; Frederick J. Telecky, Jr.

(57) ABSTRACT

Narrowband interference can seriously degrade the overall performance of a communications network without significantly damaging a large percentage of the communications network's transmissions. In a single tone communications network, narrowband interference can reduce the overall signal-to-noise ratio to a level such that a receiver can no longer accurately decode the received transmission. However, the receiver's filters and equalizers often can filter out the effects of the narrowband interference and the receiver can accurately decode the received transmission if the receiver can restart the decoding at the point when the narrowband interference began interfering with the transmission. A technique using sequential decoding with backtracking and adaptive equalization permits the receiver to adapt to the presence of the narrowband interference and backtrack the decoding to a point prior to the interference.

26 Claims, 4 Drawing Sheets

SEQUENTIAL DECODING WITH BACKTRACKING AND ADAPTIVE EQUALIZATION TO COMBAT NARROWBAND INTERFERENCE

This application claims priority to the provisional application entitled "Sequential/Backtrack Decoding with Adaptive Equalization to Combat Narrowband Interference", filed May 14, 2001, Ser. No. 60/290,690, which provisional application is incorporated herein by reference.

FIELD OF THE INVENTION

This invention relates generally to digital communications systems, and particularly to methods for providing immunity to narrowband interference and errors.

BACKGROUND OF THE INVENTION

Radio frequency (RF) spectrum is a valuable commodity in today's world. There are more people desiring to use the RF spectrum than there is spectrum to go around, so use of the spectrum must be regulated. In many countries, the RF spectrum is regulated by governmental bodies. The Federal Communications Commission (FCC) regulates the RF spectrum in the United States.

The RF spectrum is regulated usually in one of two ways. A first way that governmental bodies regulates the RF spectrum is to sell portions of it to the highest bidder. The winning bidder, then has exclusive use of the particular portion of the RF spectrum that he has just purchased. This is way that RF spectrum for cellular telephones, television and radio channels are allocated. Single user allocations are the preferred method for applications where interference from other sources cannot be tolerated.

A second way that the government regulates RF spectrum usage is to create certain bands where anyone can use the RF spectrum as long as they comply with specified spectrum usage rules. For example, in the United States, the FCC has created three such bands. These bands are called the industrial, scientific, and medical (ISM) and the unified national information infrastructure (UNII) bands and are in the 900 MHz, 2.4 GHz, and 5.7 GHz portions of the RF spectrum. Anyone may use the spectrum in these bands as long as they are able to accept interference from other users and do not cause undue interference to other users.

The ISM and UNII bands have created a huge market for wireless consumer electronics products, such as cordless telephones, wireless computer products, and wireless computer networks. However, the popularity of the bands has resulted in a problem that many product developers did not anticipate, namely, performance degradation due to inter-product interference.

In wireless computer networks, the performance degradation is seen mainly in the network's data transfer rates. A wireless network today is capable of delivering a data transfer rate of 11 Mbps or more in an interference free environment, but if interference is introduced, the data transfer rate may drop to only a small fraction of the maximum.

Interference to a wireless computer network may come from many different forms. Sources of interference may include large appliances in the environment, other electronic devices such as pagers, cordless telephones, and microwave ovens, and other wireless computer networks. The relatively simple sources of interference such as appliances and pagers and telephones are relatively easy to deal with because their interference is typically periodic and is usually predictable. Because the interference is predictable, it is easy to avoid.

Interference from other wireless networks are more difficult to deal with due to the bursty nature of computer data traffic and the fact that certain types of networks follow a random transmission pattern, making it extremely difficult to predict where and when they will transmit next.

One solution, often used for single tone (also known as single carrier) wireless networks, is to interleave the transmitted data stream. It is common to encode the original data stream into a stream of encoded bits prior to transmission. Interleaving of the stream of encoded bits involves the dispersal of encoded bits that were adjacent to one another. The purpose of interleaving is to reduce the probability that an error or interferer can damage transmitted bits that are adjacent to one another in the encoded bit stream. Single bit errors can be detected and corrected with low complexity error correcting codes, while error correcting codes that are able to correct multiple adjacent bit errors are much more complex with a complexity that increases dramatically with increasing number of bits.

However, interleaving has several disadvantages that make it inappropriate in some situations. In the case of wireless local area networks, the channel impairments are often dominated by multipath interference, in which the transmitted signal is reflected off bodies lying in between transmitter and receiver. The multiple reflections arrive at the receiver and present multiple delayed copies of the transmitted signal. This results in multiple copies of the transmitted signal to be added together at slightly different delays, causing self-interference. After processing at the receiver, this effect manifests itself as transmitted bits having an "echo" that spills into subsequent bits. To deal with this type of interference, one strategy that is possible is to compensate for and subtract out the after-echo effect of the previous bits. But for this to be effective, bits must be processed at the receiver in the order they were transmitted over the channel. Interleaving is explicitly designed to destroy this ordering and thus makes the "compensation-and-subtraction" strategy unworkable. A main motivation for the present invention is to find a way of dealing with narrowband interference that still allows the use of the "compensation-and-subtraction" strategy against the also-present multipath interference. That is, it is desirable to find a way of combating narrowband interference that does not involve interleaving or any other technique that involves the destruction of the ordering of the transmitted bits.

A need has therefore arisen for a technique that permits dynamic and adaptive solutions to the problem of narrowband interference to single tone wireless networks.

SUMMARY OF THE INVENTION

In one aspect, the present invention provides a method for error recovery in a wireless network resulting from a collision between a transmission and narrowband interference, the method comprising receiving and decoding the transmission, detecting the presence of the narrowband interference in the transmission, reconfiguring a signal processor to compensate for the narrowband interference, backtrack the decoding to a point prior to the presence of the narrowband interference, and restart the decoding with the reconfigured signal processor.

The present invention provides a number of advantages. For example, use of a preferred embodiment of the present invention permits the acceptance of a transmission damaged by narrowband interference without requiring a re-transmission or suffering a significant performance downgrade.

Also, a preferred embodiment of the present invention allows an adaptive equalizer time to compensate for the narrowband interference without requiring that data already transmitted be re-transmitted.

Additionally, a preferred embodiment of the present invention provides a system that can dynamically adapt to different types of interference and errors, not limiting itself to a predetermined "worst-case" error or interference.

Additionally, a preferred embodiment of the present invention employs a sequential decoder with adaptive equalizers, in order to exploit the natural backtracking properties of sequential decoders.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Networks adhering to the IEEE 802.11 technical standard and its more advanced version, IEEE 802.11b, are among the most widely available wireless networks today. The IEEE 802.11b wireless network operates in the 2.4 GHz Industrial, Scientific, and Medial (ISM) radio frequency (RF) spectrum band and provides up to 11 Mbps of data transfer rate. The IEEE 802.11 wireless network is specified in a technical standard document, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications" which is incorporated herein by reference. The IEEE 802.11b wireless network is specified in a supplement to the IEEE 802.11 technical standard, "IEEE Std 802.11b-1999 (Supplement to ANSI/IEEE Std 802.11, 1999 Edition) Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band" which is incorporated herein by reference.

The present invention is applicable to wireless networks using single carrier (single tone) modulation techniques that encounter narrowband interference. While for discussion purposes, the focus is mainly on wireless networks adherent to the IEEE 802.11b and Bluetooth technical standards, the ideas presented in the preferred embodiments of the present invention have applicability in other types of networks and other sources of interference. Therefore, the present invention should not be construed as being limited only to IEEE 802.11b and Bluetooth wireless networks.

Figure 1:
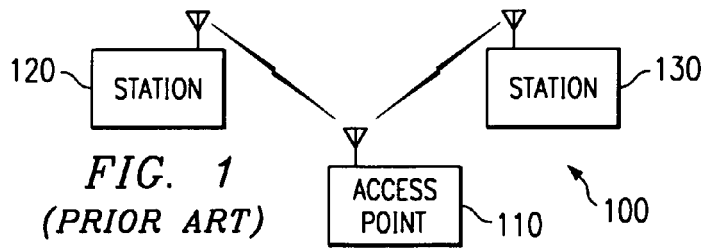
FIG. 1 illustrates an exemplary (prior art) configuration for an IEEE 802.11 wireless local area network.

Referring now to FIG. 1, a diagram (prior art) of a typical wireless network configuration according to the 802.11 technical standard. Note that FIG. 1 displays one possible configuration of an 802.11 wireless network out of the many different configurations that are possible. FIG. 1 illustrates a wireless network 100 comprising an access point 110 that is wirelessly connected to a first wireless station 120 and a second wireless station 130.

In an 802.11 wireless network, there are two modes of communications, contention-free and contention communications. In contention-free communications, an access point controls all communications by transmitting poll frames to a wireless station, granting the wireless station the permission to transmit its own frames for a specified duration. In contention communications, each wireless station is able to contend for access to the shared communications medium. When a wireless station obtains access to the shared communications medium, it is free to transmit.

In a single carrier (sometimes referred to as a single tone) communications system, such as a system specified by the IEEE 802.11b technical standard, data bits that are to be transmitted as a single data symbol are encoded using some coding scheme as specified in a technical standard. The encoded data symbol then receives further processing, filtering, and amplification. The encoded data symbol is then transmitted via an antenna. A similar, but reversed procedure occurs for a received data symbol converting it back into data bits.

Figure 2:
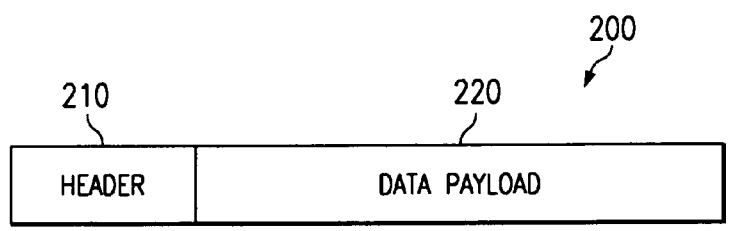
FIG. 2 illustrates a transmission packet frame structure (prior art) of an IEEE 802.11 wireless network.

Referring now to FIG. 2, a diagram (prior art) illustrates a single transmission frame of an IEEE 802.11b wireless network. FIG. 2 displays a simplified top-level diagram of an IEEE 802.11b transmission frame 200. The transmission frame 200 comprises a header 210 and a data payload 220. The header 210 contains information such as a destination address and crucial control information for use in synchronization and equalization. In fact, according to the IEEE 802.11b technical standard, the header contains much information that can be used by the receiver for purposes such as packet detection, synchronization, and channel estimation and equalization. The purpose of the internal adaptive equalizer is to adaptively form an estimate of the channel seen by the current transmission frame, so that the receiver can compensate, i.e., equalize, the impairments introduced by the channel.

Another wireless network standard is the Bluetooth (BT) special interest group (SIG) technical standard. Specified in the "Specification Volume 1: Specification of the Bluetooth System, Version 1.1, Feb. 22, 2001," which is incorporated herein by reference. Additionally, the IEEE has adopted Bluetooth as technical standard 802.15.1. BT wireless networks are intended as replacements for low data-rate wired connections, such as parallel and serial connections, and universal serial bus connections between digital devices. As such, BT wireless networks are typically small (or personal) area networks, implying low transmitted power levels.

Figure 3:
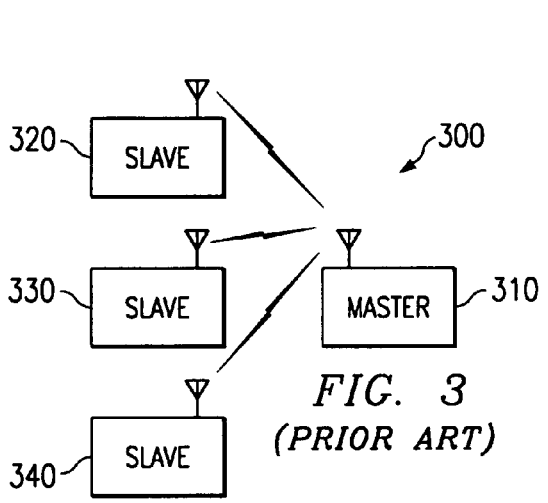
FIG. 3 illustrates an exemplary (prior art) configuration for a Bluetooth wireless network.

Referring now to FIG. 3, a diagram (prior art) of a typical wireless network configuration according to the BT SIG technical specifications. Note that FIG. 3 displays one possible configuration of a BT wireless network out of the many different configurations that are possible. FIG. 3 illustrates a BT wireless network 300 comprising a master unit 310 and three slave units 320, 330, and 340. The master unit 310 is wirelessly connected to the three slave units. According to the BT SIG specifications, a slave unit cannot communicate unless it is specifically addressed in a packet from the master unit.

A BT network operates in the 2.4 GHz ISM band, along with IEEE 802.11b wireless networks. It uses a frequency hopping, time-division duplex scheme with a time slot length of 625 micro-seconds. The transmission pattern is as follows: the master unit and the slave units are granted alternating time slots, with each slot being approximately one-MHz wide in bandwidth. After each time slot, the Bluetooth network changes transmission frequency. Bluetooth networks use a fixed hopping pattern for their frequency shifts. If a master unit is granted a time slot number 1, then the master unit can transmit during that time slot and all subsequent odd numbered time slots. Time slots dedicated to the master unit are referred to as master->slave (master-to-slave) time slots. The slave unit(s) are then assigned time slot number 2 and then all subsequent even numbered time slots. Time slots dedicated to the slave unit(s) are referred to as slave->master (slave-to-master) time slots. A unit, either master or slave(s), cannot transmit outside of its assigned time slots, without using special provisions provided for transmitting a packet of length greater than one time slot.

Figure 4:
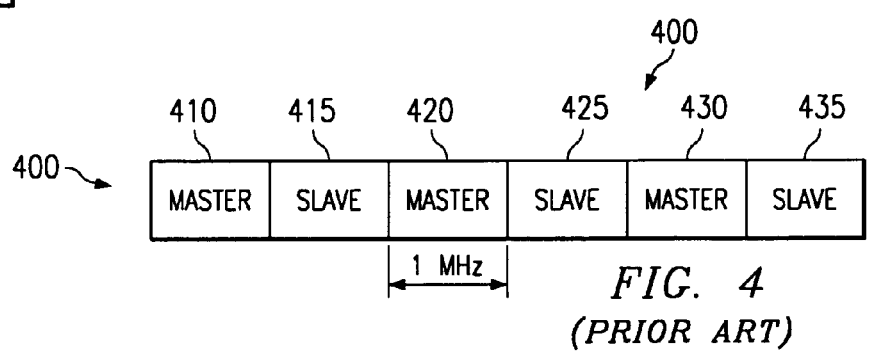
FIG. 4 illustrates a transmission time slot structure of a Bluetooth wireless network.

Referring now to FIG. 4, a diagram (prior art) illustrates the alternating master->slave and slave->master time slot structure of a Bluetooth wireless network. FIG. 4 displays an alternating sequence of Bluetooth master->slave and slave->master time slots (slots 410, 415, 420, 425, 430, and 435). A Bluetooth master unit may transmit to a single slave unit or multiple slave units in a single master->slave time slot. A Bluetooth slave unit may only transmit a response back to a Bluetooth master unit if it was specifically addressed in a master to slave transmission. Additionally, the Bluetooth slave unit must transmit in the slave->master time slot immediately following the master->slave unit that carried the master to slave transmission, unless the slave->master time slot has already been reserved.

According to the IEEE 802.11b technical standard, the signal transmitted by compliant wireless networks has at least a 20 MHz bandwidth. When compared to the 20 MHz bandwidth of the IEEE 802.11b wireless network, a Bluetooth wireless network's 1 MHz bandwidth is relatively narrow. However, since both types of wireless networks share the same 83 MHz 2.4 GHz ISM band (from 2400 MHz to 2483 MHz), there is a significant probability of collisions when the two networks are transmitting.

Because of the relatively narrow bandwidth of the Bluetooth transmission, it is not possible for the Bluetooth transmission to completely destroy an entire IEEE 802.11b transmission. Whenever the two transmissions collide, it is expected that the Bluetooth transmission is lost while only a fraction of the IEEE 802.11b transmission is lost.

As discussed previously, an IEEE 802.11b transmission comprises a header and a data payload. The header contains, among other things, a sequence of information bits that can be used by the receiver to train its adaptive equalizer. The purpose of training the adaptive equalizer is to adaptively form an estimate of the channel based on how it affects the current transmission frame, so that the receiver can compensate for any impairments introduced by the channel. The information contained in the header can also used to make adjustments in the digital filter(s) contained in the receiver.

Several possible scenarios are possible for collisions between an IEEE 802.11b transmission and a Bluetooth transmission. Of course, the transmissions may miss each other completely. Misses are events of high probability in light to moderately loaded networks. However, in heavily loaded networks, collisions occur too often. In the event that a collision does occur between the two transmissions, the particular portion of the IEEE 802.11b transmission packet that is damaged, e.g., the header or the data payload or both, by the Bluetooth transmission plays a vital role in how the data contained in the IEEE 802.11b transmission is received.

Figure 5A:
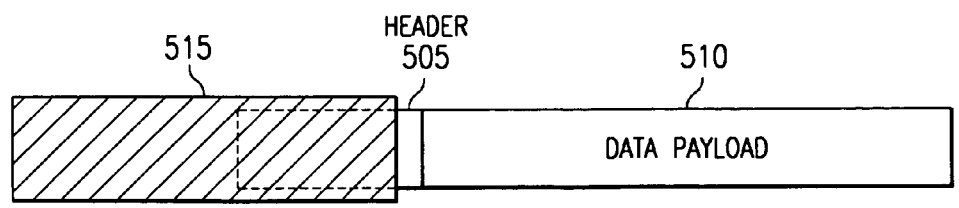
FIGS. 5a–d illustrate possible scenarios for a collision between a Bluetooth transmission frame and an IEEE 802.11 transmission packet.

Referring now to FIGS. 5a–d, diagrams illustrate multiple different possible scenarios for collisions between an IEEE 802.11b transmission and a Bluetooth transmission. FIG. 5a displays an IEEE 802.11b transmission 500 (made up of a header 505 and a data payload 510) and a Bluetooth transmission 515. Note that the relative sizes of the IEEE 802.11b transmission 500 and the Bluetooth transmission 515 are not to scale and that there is no intention to make the figures to scale. FIG. 5a displays the Bluetooth transmission 515 damaging only the header 505 of the IEEE 802.11b transmission.

However, since the Bluetooth transmission 515 has a relatively small bandwidth compared to the header 505, only a portion of the information carried in the header 505 is damaged. Therefore in all likelihood, the damaged header 505 is received by its intended recipient. Because it is still able to receive the header 505, the receiver of the damaged header 505 is able to train its adaptive equalizer and adjust its digital filter(s) based on the information contained therein. The receiver is able to use the damaged information contained in the damaged header 505 to train its adaptive equalizer and adjust its digital filter(s). This means that the adaptive equalizer and the digital filter(s) are trained and adjusted to the presence of the Bluetooth transmission 515.

The adaptive equalizer adapts itself to attenuate the frequency band covered by the Bluetooth transmission 515 and the digital filter(s) is adjusted to filter-out the frequency band covered by the Bluetooth transmission 515. The data payload 510, which was not damaged by the Bluetooth transmission 515, is received in a normal fashion. Since the adaptive equalizer has been adapted to attenuate the frequency band covered by the Bluetooth transmission 515 and the digital filter(s) are adjusted to filter-out the frequency band covered by the Bluetooth transmission 515, the signal energy carried in the data payload 510 at the frequency of the Bluetooth transmission 515 will be eliminated. However, since the filtered frequency band is not the sole carrier of any particular group of data, no data is lost. The actual effect of this particular collision is minimal, with only a small reduction in the overall signal-to-noise ratio resulting from the elimination of the frequency band covered by the Bluetooth transmission 515.

Figure 5B:
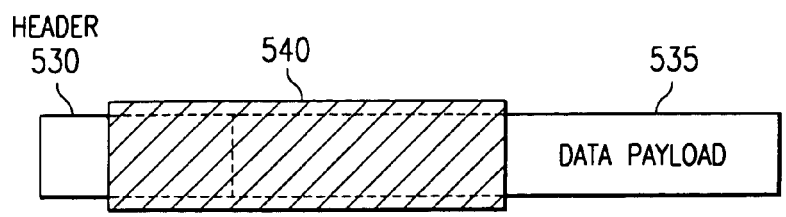

Referring now to FIG. 5b, a figure illustrates a collision between an IEEE 802.11b transmission 525 and a Bluetooth transmission 540 wherein the Bluetooth transmission 540 damages both a header 530 and a data payload 535 of the IEEE 802.11b transmission 525. As discussed previously, the damage caused to the header 530 has minimal effect on the system performance of the IEEE 802.11b wireless network. This is due to the fact that the receiver's adaptive equalizer is able adapt itself to attenuate the frequency band covered by the Bluetooth transmission 540 and the digital filter(s) is adjusted to filter-out the same frequency band. The portion of the data payload 535 that is damaged by the Bluetooth transmission 540 also loses signal energy that is carried in the frequency band covered by the Bluetooth transmission. The portion of the data payload 535 that is not damaged by the Bluetooth transmission 540 has no signal energy loss. However, due to the configuration of the adaptive equalizer, the signal energy that is in the frequency band covered by the Bluetooth transmission is ignored. The net result of a collision of the type displayed in FIG. 5b is similar to the net result of a collision of the type displayed in FIG. 5a.

Figure 5C:
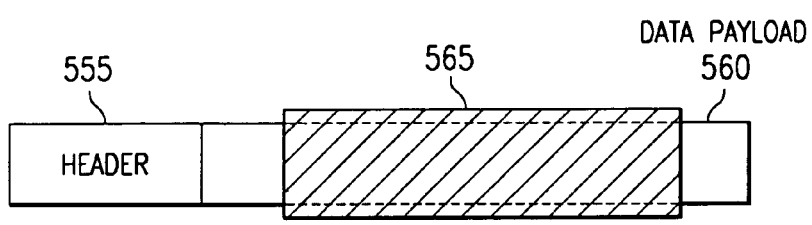

Referring now to FIG. 5c, a figure illustrates a collision between an IEEE 802.11b transmission 550 and a Bluetooth transmission 565 wherein the Bluetooth transmission 565 damages only a data payload 560 of the IEEE 802.11b transmission 550 and causes no damage to a header 555 of the IEEE 802.11b transmission 550. The collision illustrated in FIG. 5c presents perhaps the greatest problem in terms of performance degradation to the IEEE 802.11b wireless network by a Bluetooth wireless network. The Bluetooth transmission 565 damages only the data payload 560 and does not damage the header 555. This implies that the adaptive equalizer of the recipient was trained on an interference free channel and that the digital filter(s) is adjusted on an interference free channel as well. However, the data payload that the receiver receives has been damaged by the Bluetooth transmission 565.

Since the adaptive equalizer and the digital filter(s) of the recipient was trained/adjusted on a header that was not damaged by the Bluetooth 565 transmission, the damaged portion of the data payload 560 will appear to have errors. If there are too many errors, then in most cases, the recipient will give up and signal the sender to re-transmit. After the Bluetooth transmission 565 ends, the data payload 560 becomes good again, but in most cases, it is too little too late.

Figure 5D:
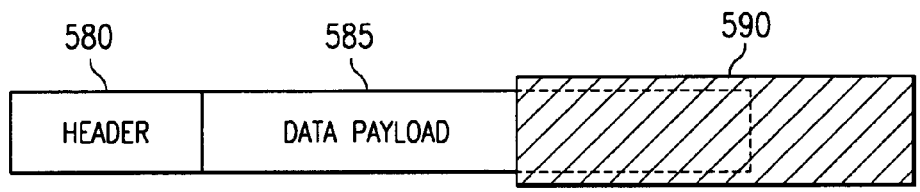

Referring now to FIG. 5d, a figure illustrates a collision between an IEEE 802.11b transmission 575 and a Bluetooth transmission 590 wherein the Bluetooth transmission 590 damages only a data payload 585 of the IEEE 802.11b transmission 575. The scenario depicted in FIG. 5d is essentially the same as the scenario discussed in FIG. 5c with the exception that the scenario in FIG. 5d displays a case when the Bluetooth transmission 590 does not complete until the IEEE 802.11b transmission 575 completes. According to a preferred embodiment of the present invention, the two scenarios are handled in a similar fashion (as discussed below). The Bluetooth transmission 590 does not interfere with the header 580, so the receiver's adaptive equalizer and digital filter(s) adapts/adjusts to a channel without interference. When the Bluetooth transmission 590 collides with the data payload 585, the receiver begins to receive errors. If too many errors are received, then the recipient will most likely give up and request that the sender re-transmit the transmission 575.

Data transmitted on an IEEE 802.11b wireless network may be encoded using a convolutional code. Such encoding is used to protect the data bits being transmitted. Convolutional codes are well understood by persons of ordinary skill in the art of the present invention.

Figure 6:
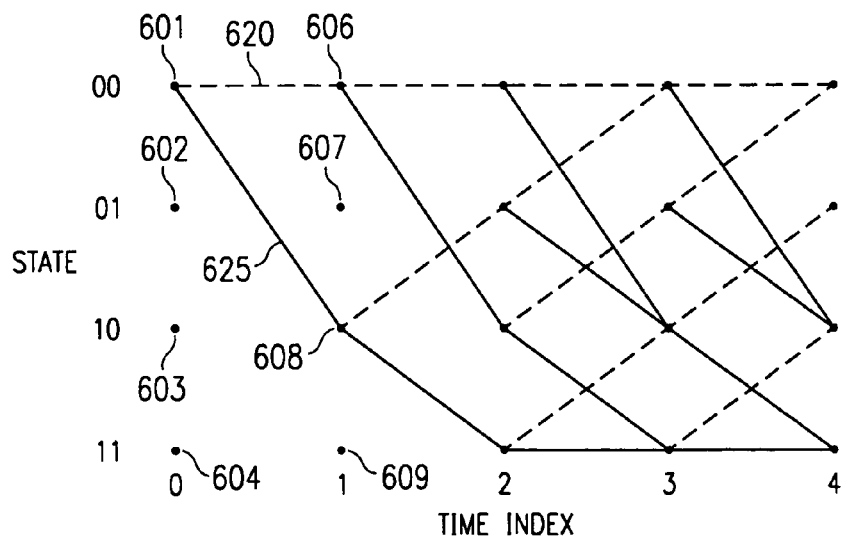
FIG. 6 illustrates a decoding trellis for a particular convolutional code.

Referring now to FIG. 6, a figure illustrates a code trellis used to display the steps involved in the decoding of a received stream of data symbols previously encoded by a convolutional code such as one described above. A code trellis may be thought of as a series of states with the states replicated for multiple time indexes. Each state corresponds to a different data symbol generated by the convolutional code. In FIG. 6, each data bit is used to generate a data symbol that is two bits long, therefore, there are $2^2$ (or 4) states. In general, for a data symbol that is N bits long, the code trellis will have $2^N$ states. In the example displayed in FIG. 6, the states are 00, 01, 10, and 11.

The code trellis is simply a repetitious display of the different states repeated once for each time index. The total number of time indexes in a code trellis is a function of how many data symbols are transmitted as part of a single transmission unit. FIG. 6 displays a transmission unit that contains five data symbols hence the time indexes range from zero to four. Four black circles 601, 602, 603, and 604 represents states 00, 01, 10, and 11 respectively for time index zero, while four other black circles 606, 607, 608, 609 represents states 00, 01, 10, and 11 respectively for time index one. In most situations, the decoding process always begins in state 00, displayed as circle 601 in FIG. 6.

States in adjacent time indexes are connected via lines. The lines represent a state transition from a time index to a next time index due to a particular transmitted data bit. In FIG. 6, dotted lines represent a transition based on the transmission of a "zero", while solid lines represent a transition based on the transmission of a "one". For example, in FIG. 6, the decoding begins in state 00 (circle 601) of time index zero. Should the encoder transmit a "zero", the encoder will remain in state 00 (circle 606) at time index one. This transition is displayed as a dotted line 620. Should the encoder instead transmit a "one", the encoder will transition to state 10 (circle 608) at time index one. This transition is displayed as a solid line 625. Since there was only one initial state at time index zero, there are only two possible states at time index one. At time index two, there are however, four possible states. The code trellis continues until the end of the transmission unit (three additional time indexes in FIG. 6).

A commonly used decoder for decoding the received convolutionally encoded data symbols is known as a Viterbi decoder. The Viterbi decoder searches a code trellis in a breadth-first manner, i.e., the Viterbi decoder processes the received symbols in a strict chronological order and never moves backwards to restart a search from a previous point. Viterbi decoders simultaneously search multiple paths through the code trellis, in a way that ensures (under appropriate assumptions) that the optimal path is among the multiple paths. The operation of a Viterbi decoder is beyond the scope of the discussion of the present invention. Viterbi decoders and how they operate are well known to persons of ordinary skill in the art of the present invention.

Figure 7:
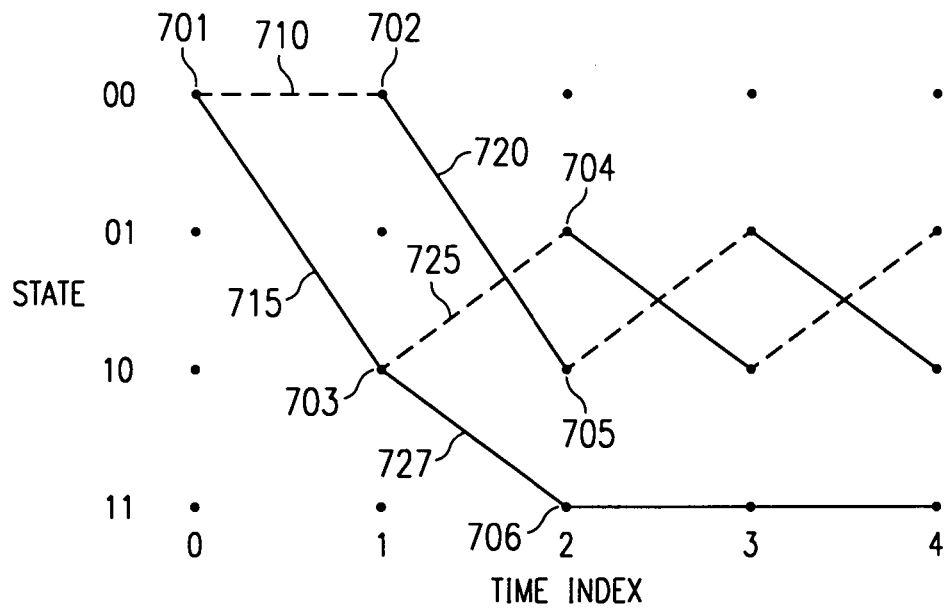
FIG. 7 illustrates a series of steps taken by a Viterbi decoder for decoding the convolutional code displayed in FIG. 6.

Referring now to FIG. 7, a diagram illustrates the operation of a Viterbi decoder for a particular set of inputs. As stated earlier, a Viterbi decoder can simultaneously search multiple paths through the code trellis and selects the optimum path using some performance metric. An example of a performance metric is a calculated Hamming distance between the received symbol and all possible states symbols reachable by current decoder state(s) as a result of the received symbol. The Hamming distance is a well-known metric to those of ordinary skill in the art of the present invention. The metric is maintained for the multiple paths through the code trellis until the decoding is complete and the optimum path is the path with the lowest performance metric.

FIG. 7 displays an example of the decoding operation of a Viterbi decoder for a particular set of inputs. The decoder begins in state 00 (circle 701) and then it receives an input symbol. Based on the input symbol, the decoder determines that it can transition to either state 00 (circle 702) via a transition 710 or state 10 (circle 703) via a transition 715. From there, the decoder receives another input symbol. Based on the input, the decoder determines that it can transition to state 10 (circle 705) via a transition 720 or either state 01 (circle 704) via a transition 725 or state 11 (circle 706) via a transition 725. At each time unit (a reception of an input symbol), the Viterbi decoder holds the optimal path from the original state (circle 701) to each possible state at that time unit. More importantly, the Viterbi decoder algorithm can only move forward. This means that once an input symbol is received and the set of multiple paths is selected, the decoder cannot go back to reselect different paths in the set.

Another decoder that is used to decode the received convolutionally encoded data symbols is known as a sequential decoder. A commonly used sequential decoder belongs to a class of decoders that utilizes the Fano algorithm. Sequential decoders search a single path through the code trellis at any given time, and therefore cannot ensure that it is selecting the "best" path. The basic operation of a sequential decoder is relatively simple. At any given time index, the decoder examines its possible transitions into a next state based upon its current stated and a received data symbol and selects the transition that will result in the best performance metric value. An example of a performance metric would be the calculated Hamming distance discussed previously.

If, in the process of traversing the code trellis, the decoder determines that the path that it has chosen is not performing well, then the decoder can backtrack. Backtracking usually is triggered when the resulting performance metrics exceed some predetermined threshold. The decoder backtracks by going backwards in the code trellis, transitioning from the current state to a previous state. The decoder can continue to backtrack until it reaches a point where its decisions result in better performance metric values or until it reaches the initial state at time index zero.

Figure 8:
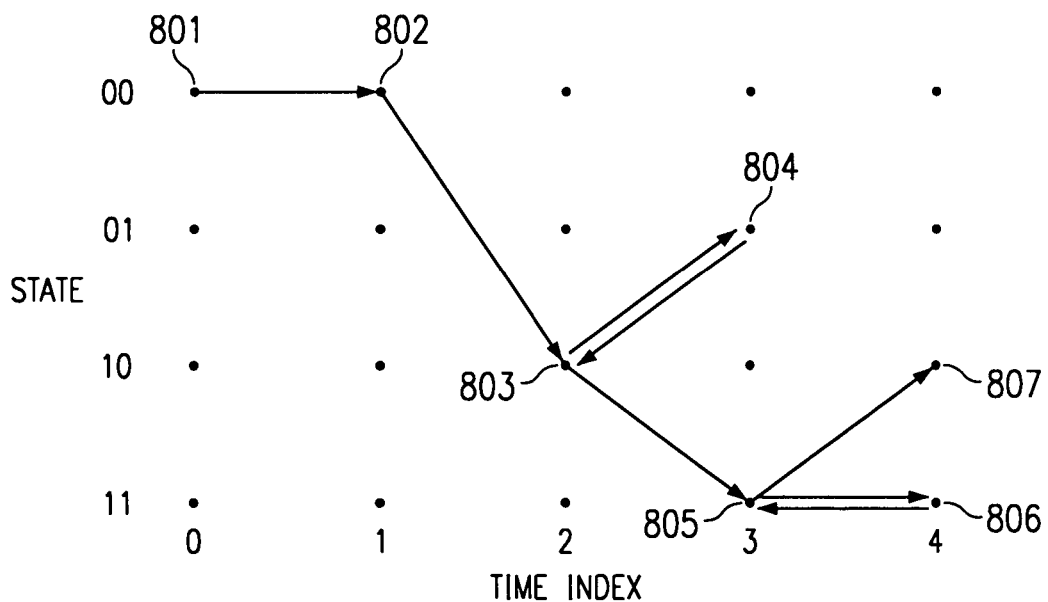
FIG. 8 illustrates a series of steps taken by a sequential decoder for decoding the convolutional code displayed in FIG. 6, according to a preferred embodiment of the present invention.

Referring now to FIG. 8, a figure illustrates the operation of a sequential decoder for a particular set of inputs. The decoder begins in state 00 (circle 801) and based on received data and its performance metric calculations, decides to transition to state 00 (circle 802). Additional received data leads the decoder to state 10 (circle 802). More received data results in the decoder transitioning to state 01 (circle 804). However, in this state (circle 804) and with further received data, the resulting performance metrics exceed some predetermined threshold, therefore, the decoder backtracks back to state 10 (circle 803) and using the received corresponding to time index 2, the decoder determines that it will transition to state 11 (circle 805) instead of state 01 (circle 804). The process continues until the decoding process is complete.

As discussed previously, when a Bluetooth transmission damages the header portion of an IEEE 802.11b transmission, the receiver's adaptive equalizer and digital filter(s) are able to compensate due to the training information that is provided within the header portion of the IEEE 802.11b transmission. The adaptive equalizer is able to use the training information to minimize the effects of the Bluetooth transmission while the digital filter(s) is able to filter-out the frequency band of the Bluetooth transmission. On the other hand, if the Bluetooth transmission damages only the data payload portion of an IEEE 802.11b transmission, multiple errors are likely to result because the receiver's adaptive equalizer and digital filter(s) were trained using interference free training information.

Immediately after a collision between transmissions, the receiver will not be able to accurately decode the received transmissions, resulting in the received symbols received immediately after the collision to be marked as errors. However, it is possible for the receiver to estimate and react to the new source of interference. The receiver may be able to adjust its digital filter(s) and adaptive equalizer in response to the interference. However, it takes time to do so. During the time that it takes to estimate and react to the new source of interference, several symbols would have arrived and have been processed. These symbols will most likely be marked as errors. In systems that use Viterbi decoding, a burst of several contiguous symbols being marked as errors will cause an error event.

An error event is a sequence of errors that causes the receiver to mark the sequence as a valid code sequence. In a Viterbi-style decoder, once an error event has occurred, the errors have been retained as "survivors" to the exclusion of the true transmitted sequence, and it is then impossible for the decoder to recover and decode the received sequence correctly. The net result of an error event is that the decoder has accepted incorrect data as being correct, and the final output of the decoder will include these errors. In many wireless LAN applications, there is a separate final overall error check after decoding has been completed, and if the decoded data fails this independent check, the receiver will request that the transmitter retransmit the damaged transmission.

The use of a decoder that is capable of backtracking to a point previous to the appearance of the interferer with a system that can rapidly adjust its digital filter(s) and adaptive equalizer provides a reactive response to the interferers, possibly avoiding irrevocable error events and the need for retransmissions. The ability to backtrack allows the decoder to attempt to reselect a good path through the code trellis with the adjusted digital filter(s) and adaptive equalizer.

Figure 9:
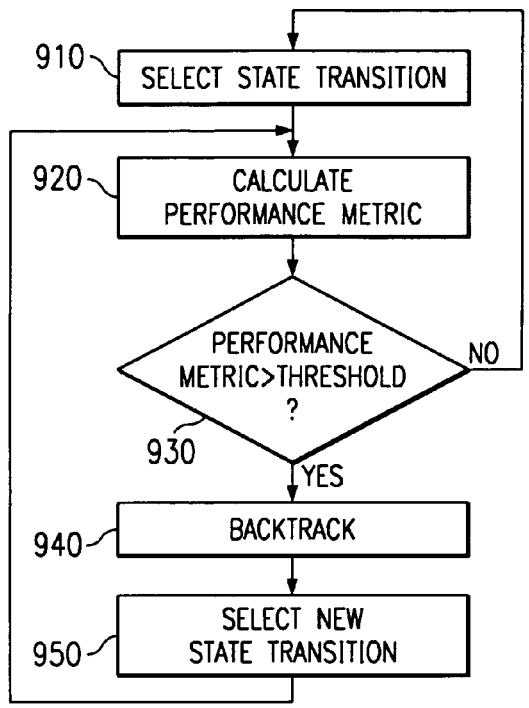
FIG. 9 illustrates a portion of a sequential decoder's algorithm that pertains to backtracking, according to a preferred embodiment of the present invention.

Referring now to FIG. 9, a flow diagram illustrates a backtracking portion of a sequential decoder's decoding algorithm according to a preferred embodiment of the present invention. FIG. 9 displays only the portion of the decoder's decoding algorithm that pertains to backtracking. As part of its normal operations, the decoder will select a state transition (910) to a next state based upon its current state and the data it has received. With the next state in hand, the decoder calculates a new performance metric (920) and then compares the performance metric with some specified threshold value. According to a preferred embodiment of the present invention, the performance metric is a sum of a metric for the current state plus a metric for the transition. This performance metric is assigned to the next state. If the difference between the old performance metric and the newly calculated performance metric exceeds the threshold (930), then the decoder will not accept the newly calculated state and backtrack (940).

According to a preferred embodiment of the present invention, the decoder will calculate a new performance metric for all possible transitions out from the current state based on the received input symbol and will select the transition that results in the best performance metric. Again, according to a preferred embodiment of the present invention, the performance metric is a sum of a metric assigned to the current state plus a metric assigned to the transition. It is this calculated performance metric that is used to determine if the decoder will backtrack. If there are several transitions that result in identical performance metrics, the decoder may decide to select one at random or it may have a specific algorithm to select a particular transition.

The comparison in block 930 may be based simply on a comparison of a difference between the new performance metric and the old performance metric and the threshold. The decoder is able to backtrack as far as it wishes, all the way back to the initial state at time index 0 if needed.

While the decoder is backtracking to find a better path through the code trellis, the digital filter(s) and adaptive equalizer of the receiver are simultaneously making adjustments. Digital filters are written like computer programs and use arithmetic means to perform filtering operations on a data stream. Filter parameters, such as filter order, break frequency, filter type, etc., are specified by a series of coefficients that may be changed at any time during operation. The adaptive equalizer is similarly specified and may also be changed at any time during operation.

According to a preferred embodiment of the present invention, immediately, upon detecting a burst of several consecutive symbol errors, the receiver will attempt to adjust its filters and adaptive equalizer. Adaptive algorithms are used that compare tentative decisions made by the decoder to the received data. The algorithms change parameters in proportion to the detected difference. By the time that the filters and adaptive equalizer have had time to adjust to the presence of the interferer (the Bluetooth transmission), the sequential decoder would have had the opportunity to backtrack to a point in the code trellis where things started to go wrong, i.e., the point where the Bluetooth transmission collided with the IEEE 802.11b transmission.

According to a preferred embodiment of the present invention, the receiver maintains a sufficient amount of the received sequence to allow backtracking to be useful. The specific amount of the received sequence maintained could be determined by the amount of time required to backtrack and move forward, compared to the total amount of time permitted to decode the received data and to produce decoded data. For example, if the receiver can backtrack and subsequently re-decode X amount of data prior to the expiration of the allowed time limit, it would be inefficient to maintain Y amount of data where Y is greater than X.

With the newly adjusted filters and adaptive equalizer, the sequential decoder will be able to find a suitable path through the code trellis. According to a preferred embodiment of the present invention, backtracking is possible because the receiver has saved the entire received transmission as it is being received. By having the transmission saved in memory, the sequential decoder can backtrack and apply newly adjusted filters and adaptive equalizer to the saved symbols and not require the retransmission of the transmission.

According to another preferred embodiment of the present invention, the operation of the sequential decoder is sufficiently fast so that it can backtrack and yet finish the decoding process within the maximum allowed time permitted by the technical standard. The sequential decoder is clocked at a rate that is significantly faster than the transmission rate of the data symbols. According to the IEEE 802.11b technical standard, a maximum allowed amount of time after the receipt of an end of a packet in which decoding of the packet must be complete is specified.

Figure 10:
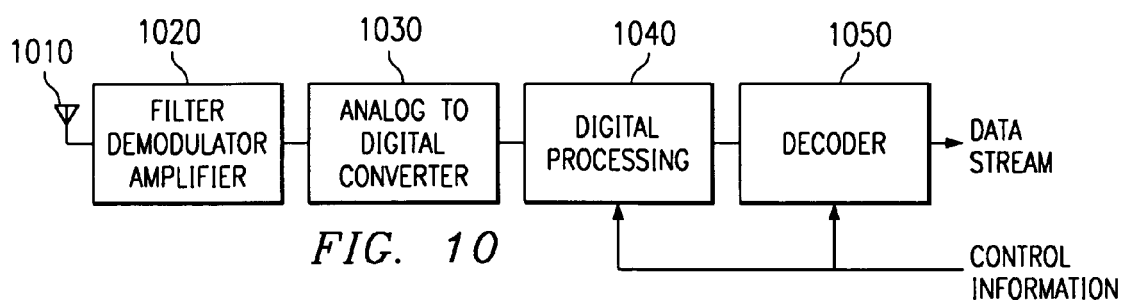
FIG. 10 illustrates a receive path of a radio receiver according to a preferred embodiment of the present invention.

Referring now to FIG. 10, a diagram illustrates a high level view of a portion of a receive path of a receiver according to a preferred embodiment of the present invention. An antenna 1010 receives the over-the-air transmission. The received transmission is forwarded to a filter-demodulator-amplifier unit 1020 where the received transmission is filtered, down-converted to an internal frequency, and amplified to a level suitable for processing. The filter-demodulator-amplifier unit 1020 is an analog unit and processing performed in the unit 1020 is performed in the analog domain. An additional operation that is sometimes performed in the unit 1020, but is not shown in FIG. 10 is channel equalization. In many communications systems, the receiver has an analog channel equalizer to help mitigate high-frequency attenuation in the communications channel.

After being filtered, demodulated, and amplified, the transmission is forwarded to an analog-to-digital converter 1030 where it is converted into a digital data stream. After being converted into a digital data stream by the analog-to-digital converter 1030, the digital data stream receives digital processing in a digital processing unit 1040. The digital processing includes, but is not limited to: digital filtering, pulse shaping, and digital equalization. The digital processing unit 1040 receives control and information via a connection between it and a processor unit (not shown). The connection provides a way for the processor unit to reconfigure the digital filter, pulse shaper, adaptive equalizer, etc. by sending configuration coefficients for the respective processing components.

After signal processing, the digital data stream is sent to a decoder unit 1050 where the digital data stream is decoded and transformed into a data stream. The decoding performed in the decoder unit 1050 can be as simple as error detection, or can be error correction. The decoder unit 1050 may be used to decode various forms of data encoding, from convolutional to block encoding, and may implement various decoding techniques, such as Viterbi decoding or sequential decoding. The decoder unit 1050 is also coupled to the processor unit (not shown) via a connection. Through the connection, the processor unit can control the operation of the decoder unit 1050. The processor unit may also use the connection to reconfigure/adjust the decoder unit 1050 to help tweak the performance of the decoder unit 1050. According to a preferred embodiment of the present invention, the decoder unit 1050 implements a sequential decoder for decoding convolutionally encoded digital data streams.

According to a preferred embodiment of the present invention, rather than waiting for a collision, error, or some other source of interference to cause a burst of errors or an error event, the receiver performs continuous, real-time estimates of the response of the communications channel. The continuous, real-time channel response can be used to continuously update the adaptive channel equalizer and digital filters in the digital processing unit 1040. The channel response can also be used to adjust the performance metric threshold used to determine backtracking.

According to another preferred embodiment of the present invention, additional circuitry is present in the receiver to determine if a Bluetooth wireless network is in fact present. Only if a Bluetooth wireless network is present, should the updated adaptive equalizer be used. If a Bluetooth wireless network is not present, the un-updated adaptive equalizer should be used. Detection of the presence of a Bluetooth wireless network is relatively simple since Bluetooth wireless networks follow a rigidly defined frequency-hopping schedule, one would only need to find the occurrence of such a transmission pattern to verify the existence of a Bluetooth wireless network.

The additional Bluetooth detection circuitry can be used to allow for faster reaction to an interferer. If the detection circuitry has already determined that a Bluetooth wireless network is operating in the vicinity, then the sequential decoder can be configured to backtrack on a lower performance metric threshold and the adaptive equalizer and the digital filters can be configured to be updated more rapidly.

According to yet another preferred embodiment of the present invention, specific profiles for different types of expected interference and a response to the interference can be pre-calculated and stored in memory. Therefore, when the system encounters interference that matches the profile of an expected source of interference, the response would have already been pre-calculated and be rapidly put into use.

According to another preferred embodiment of the present invention, a receiver continually updates its digital filter(s) and adaptive equalizer based on the channel response of the communications channel. However, it does not use the updated digital filter(s) and adaptive equalizer unless a collision occurs between the transmission and an interferer. The continual update of the digital filter(s) and adaptive equalizer permits the sequential decoder to be configured to backtrack more easily.

The discussion present above has focused on a Bluetooth wireless network transmission being the source of narrowband interference. However, there are other sources of narrowband interference. For example, in the 2.4 GHz ISM band, an extremely prevalent source of interference is microwave ovens, cordless phones, etc. Preferred embodiments of the present invention has applicability with any type of interference as long as their bandwidth is small enough that they do not destroy too large a portion of the IEEE 802.11b transmission. Additionally, other single tone wireless networks may use the ideas presented in the present invention to help increase their immunity to narrowband interference. The preferred embodiments of the present invention are in no way limited to single tone wireless networks adherent to the IEEE 802.11b technical standard.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for error recovery in a wireless network after a collision between a transmission and some narrowband interference, wherein the transmission is decoded using a sequential decoder, the method comprising:
   receiving the transmission;
   decoding the transmission;
   detecting the narrowband interference in the transmission;
   reconfiguring a digital signal processor to take into account the narrowband interference;
   backtracking over previously decoded portions of the transmission; and
   decoding the transmission using the reconfigured digital signal processor.

2. The method of claim 1, wherein the transmission is performed a single symbol at a time, and wherein the receiving step comprises receiving the transmission a single transmitted symbol at a time.

3. The method of claim 2, wherein the first decoding step comprises:
   computing a set of possible hypotheses based on the single transmission symbol;
   calculating a performance metric for each hypothesis in the set of possible hypotheses; and
   selecting a hypothesis corresponding to the best performance metric.

4. The method of claim 3, wherein the backtracking step comprises backtracking over selected hypotheses.

5. The method of claim 1, wherein the detecting step comprises detecting a burst of symbol errors.

6. The method of claim 1, wherein the detecting step comprises detecting a known sequence of interference types.

7. The method of claim 1, wherein the detecting step comprises detecting a known sequence of interferences at a known sequence of frequencies.

8. The method of claim 1, wherein the transmission occurs over a communications channel, and wherein the reconfiguring step comprises:
   obtaining a frequency response of the communications channel;
   determining the narrowband interference based on the frequency response;
   calculating a set of configuration coefficients based on the determined narrowband interference; and
   applying the calculated set of configuration coefficients to the digital signal processor.

9. The method of claim 1, wherein the backtracking step continues until the sequential decoder reaches a part of the transmission prior to the collision.

10. The method of claim 1, wherein the transmissions are performed in blocks, and wherein the backtracking step continues until the sequential decoder reaches the beginning of the transmission.

11. The method of claim 1, wherein the digital signal processor comprises an adaptive equalizer.

12. The method of claim 1, wherein the digital signal processor comprises an adaptive equalizer and a digital filter.

13. The method of claim 12, wherein the digital filter is reconfigured to filter out the narrow band interference.

14. The method of claim 12, wherein the adaptive equalizer is reconfigured to compensate for changes in the channel response due to the narrow band interference.

15. A radio receiver comprising:
   an antenna for receiving transmissions transmitted over a communications medium;
   an analog processing unit coupled to the antenna, the analog processing unit containing circuitry to filter, demodulate, and amplify a received signal provided by the antenna;
   an analog-to-digital converter coupled to the analog processing unit, the converter containing circuitry to convert the filtered, demodulated, and amplified received signal from the analog processing unit into a digital bit stream;
   a digital processing unit coupled to the analog-to-digital converter, the digital processing unit containing circuitry to digitally filter and adaptively equalize the digital bit stream;

a first control and information line coupled to the digital processing unit, the first control and information line providing configuration and operational information of the digital processing unit;

a sequential decoder coupled to the digital processing unit, the sequential decoder containing circuitry to decode a digital data stream from the digital bit stream; and a second control and information line coupled to the sequential decoder, the second control and information line providing configuration and operational information of the sequential decoder.

16. The radio receiver of claim 15, wherein the radio receiver receives transmissions within a frequency band of interest, and wherein the radio receiver further comprises an interference detection unit coupled to the digital processing unit and the sequential decoder, the interference detection unit containing circuitry to detect the presence of interference and errors within the frequency band of interest.

17. The radio receiver of claim 16, wherein the interference detection unit is a Bluetooth transmission detector.

18. The radio receiver of claim 15, wherein the radio receiver further comprises a memory coupled to the digital processing unit and the sequential decoder, the memory containing pre-computed profiles of a plurality of different types of interference and errors.

19. The radio receiver of claim 18, wherein the pre-computed profiles may be loaded into the digital processing unit and the sequential decoder immediately upon detection of interference and errors.

20. The radio receiver of claim 15, wherein the radio receiver further comprises a memory coupled to the digital processing unit and the sequential decoder, the memory containing a set of updated coefficients for the digital filter and the adaptive equalizer.

21. The radio receiver of claim 20, wherein the set of updated coefficients for the digital filter and the adaptive equalizer is continually updated based on a measured channel response of the communications channel.

22. A communications device comprising:
   an antenna for receiving and transmitting transmissions over a communications medium;
   a radio transmitter coupled to the antenna, the radio transmitter containing circuitry to transmit data;
   a radio receiver coupled to the antenna, the radio receiver comprising:
      an analog processing unit coupled to the antenna, the analog processing unit containing circuitry to filter, demodulate, and amplify a received signal provided by the antenna;
      an analog-to-digital converter coupled to the analog processing unit, the converter containing circuitry to convert the filtered, demodulated, and amplified received signal from the analog processing unit into a digital bit stream;
      a digital processing unit coupled to the analog-to-digital converter, the digital processing unit containing circuitry to digitally filter and adaptively equalize the digital bit stream;
      a first control and information line coupled to the digital processing unit, the first control and information line providing configuration and operational information of the digital processing unit;
      a sequential decoder coupled to the digital processing unit, the sequential decoder containing circuitry to decode a digital data stream from the digital bit stream; and
      a second control and information line coupled to the sequential decoder, the second control and information line providing configuration and operational information of the sequential decoder.

23. A communication device comprising:
   an analog unit configured to process incoming signals;
   an analog-to-digital converter coupled to the analog unit and configured to convert incoming signals into digital streams comprising symbols;
   a decoder coupled to the analog-to-digital converter and configured to:
      select a first state;
      calculate a performance metric;
      compare the performance metric with a predetermined threshold; and
      if the performance metric exceeds the predetermined threshold, then backtrack through the symbols.

24. The communication device according to claim 23, wherein the performance metric is a sum of a performance metric of a current state and a performance metric for the first state.

25. The communication device according to claim 23, the decoder is further configured to:
   if the performance metric is lower than the predetermined threshold, then transition to the first state.

26. The communication device according to claim 25, further comprising:
   select a second state.

* * * * *